(12) United States Patent
Aoki et al.

(10) Patent No.: US 7,577,158 B2
(45) Date of Patent: Aug. 18, 2009

(54) INFORMATION PROCESSING SYSTEM AND ACCESS METHOD

(75) Inventors: Makoto Aoki, Yokohama (JP); Takahiro Hayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 469 days.

(21) Appl. No.: 11/042,183

(22) Filed: Jan. 26, 2005

(65) Prior Publication Data

US 2006/0092828 A1    May 4, 2006

(30) Foreign Application Priority Data

Nov. 4, 2004    (JP)    ............... 2004-320036
Nov. 24, 2004   (JP)    ............... 2004-338353

(51) Int. Cl.
    *H04L 12/28*    (2006.01)
(52) U.S. Cl. ..................... 370/412
(58) Field of Classification Search ............ None
    See application file for complete search history.

(56) References Cited

U.S. PATENT DOCUMENTS

| | | | |
|---|---|---|---|
| 4,366,535 A * | 12/1982 | Cedolin et al. ........... 710/100 |
| 5,119,488 A | 6/1992 | Takamatsu et al. | |
| 5,633,999 A | 5/1997 | Clowes et al. | |
| 6,260,120 B1 * | 7/2001 | Blumenau et al. ........... 711/152 |
| 6,769,071 B1 | 7/2004 | Cheng et al. | |
| 6,802,021 B1 | 10/2004 | Cheng et al. ........... 714/4 |
| 2002/0174315 A1 | 11/2002 | Yamamoto | |
| 2003/0172331 A1 | 9/2003 | Cherian et al. | |
| 2003/0200477 A1 * | 10/2003 | Ayres ........... 714/2 |
| 2004/0107300 A1 | 6/2004 | Padmanabhan et al. | |
| 2004/0172636 A1 | 9/2004 | Do et al. | |

FOREIGN PATENT DOCUMENTS

EP    0308056    3/1989

* cited by examiner

*Primary Examiner*—Hanh Nguyen
*Assistant Examiner*—Juvena Loo
(74) *Attorney, Agent, or Firm*—Brundidge & Stanger, P.C.

(57) ABSTRACT

A plurality of logical units are set in an information processing device and a storage device and connected by logical paths. The information processing device monitors the path state. When a state change of a path has occurred, the information processing device searches for a normal path connected to the logical unit and decides a logical unit to be an object of the read request. The information processing device issues a data read request to the logical unit decided. Moreover, when a failure has occurred in the path, the information processing device performs an access to the logical unit by utilizing a path other than the path where the failure has occurred and another path sharing a part of the path where the failure has occurred.

6 Claims, 15 Drawing Sheets

FIG. 3

LU MANAGEMENT TABLE

| LU MANAGEMENT ID | LU-ID | P/S FLAG | USABILITY | LU-ID | P/S FLAG | USABILITY |
|---|---|---|---|---|---|---|
| 1 | 0101 | P | | 0201 | S | |
| 2 | 0102 | P | | 0103 | S | |
| 3 | 0202 | | | | | |

FIG. 6

| PATH | HBA-ID | ADP-ID | LU-ID | PATH FAILURE INFORMATION |
|---|---|---|---|---|
| 1 | 1 | 0101 | 0101 | 1 |
| 2 | 1 | 0102 | 0101 | 0 |
| 3 | 2 | 0101 | 0101 | 0 |
| 4 | 2 | 0102 | 0101 | 0 |
| 5 | 1 | 0101 | 0102 | 0 |
| 6 | 1 | 0102 | 0102 | 0 |
| 7 | 2 | 0101 | 0102 | 1 |
| 8 | 2 | 0102 | 0102 | 0 |
| 9 | 1 | 0101 | 0103 | 0 |
| 10 | 1 | 0102 | 0103 | 0 |
| 11 | 2 | 0101 | 0103 | 0 |
| 12 | 2 | 0102 | 0103 | 0 |
| 13 | 3 | 0201 | 0201 | 0 |
| 14 | 3 | 0202 | 0201 | 1 |
| 15 | 4 | 0201 | 0201 | 0 |
| 16 | 4 | 0201 | 0201 | 0 |
| 17 | 3 | 0201 | 0202 | 0 |
| 18 | 3 | 0202 | 0202 | 0 |
| 19 | 4 | 0201 | 0202 | 0 |
| 20 | 4 | 0202 | 0202 | 0 |

FIG. 9

| PATH ID | ERROR TYPE | START TIME | MONITORING PERIOD | JUDGMENT VALUE | DETECTED VALUE |
|---|---|---|---|---|---|
| 1 | INSTANTANEOUS ERROR | 2003/9/1 10:20:30.020 | 30 | 20 | 21 |
|   | ACCUMULATED ERROR | 2003/9/1 10:20:30.020 | 30 | 50 | 30 |
|   | PERFORMANCE ERROR | 2003/9/1 10:20:30.020 | — | 1 | 0 |
| 2 | INSTANTANEOUS ERROR | 2003/9/1 10:20:30.020 | 30 | 20 | 0 |
|   | ACCUMULATED ERROR | 2003/9/1 10:20:30.020 | 30 | 50 | 0 |
|   | PERFORMANCE ERROR | 2003/9/1 10:20:30.020 | — | 1 | 0 |
| 3 | ... | ... | ... | ... | ... |

FIG. 11

| PATH ID | 2003/8/1 | | 2003/9/1 | | 2003/10/1 | | 2003/11/1 | |
|---|---|---|---|---|---|---|---|---|
| | NUMBER OF BYTES | TIME | NUMBER OF BYTES | TIME | NUMBER OF BYTES | TIME | NUMBER OF BYTES | TIME |
| 1 | 100 | 1000 | 90 | 1000 | 80 | 1000 | 50 | 1000 |
| 2 | 100 | 1000 | 90 | 1000 | 80 | 1000 | 50 | 1000 |
| 3 | 100 | 1000 | 90 | 1000 | 80 | 1000 | 50 | 1000 |
| 4 | 100 | 1000 | 90 | 1000 | 80 | 1000 | 50 | 1000 |
| 5 | 100 | 1000 | 90 | 1000 | 80 | 1000 | 50 | 1000 |
| 6 | 100 | 1000 | 90 | 1000 | 80 | 1000 | 50 | 1000 |
| 7 | 100 | 1000 | 90 | 1000 | 80 | 1000 | 50 | 1000 |
| 8 | 100 | 1000 | 90 | 1000 | 80 | 1000 | 50 | 1000 |
| 9 | 100 | 1000 | 90 | 1000 | 80 | 1000 | 50 | 1000 |
| 10 | 100 | 1000 | 90 | 1000 | 80 | 1000 | 50 | 1000 |
| 11 | 100 | 1000 | 90 | 1000 | 80 | 1000 | 50 | 1000 |
| 12 | 100 | 1000 | 90 | 1000 | 80 | 1000 | 50 | 1000 |
| 13 | 100 | 1000 | 90 | 1000 | 80 | 1000 | 50 | 1000 |
| 14 | 100 | 1000 | 90 | 1000 | 80 | 1000 | 50 | 1000 |
| 15 | 100 | 1000 | 90 | 1000 | 80 | 1000 | 50 | 1000 |
| 16 | 100 | 1000 | 90 | 1000 | 80 | 1000 | 50 | 1000 |
| 17 | 100 | 1000 | 90 | 1000 | 90 | 1000 | 50 | 1000 |
| 18 | 100 | 1000 | 90 | 1000 | 90 | 1000 | 50 | 1000 |
| 19 | 100 | 1000 | 90 | 1000 | 90 | 1000 | 90 | 1000 |
| 20 | 100 | 1000 | 90 | 1000 | 90 | 1000 | 90 | 1000 |

INFORMATION PROCESSING SYSTEM AND ACCESS METHOD

INCORPORATION BY REFERENCE

The present application claims priorities from JP2004-320036 filed on Nov. 4, 2004, JP2004-338353 filed on Nov. 24, 2004, the contents of which are hereby incorporated herein by reference into this application.

BACKGROUND OF THE INVENTION

The present invention relates to an information processing system and an access method, and in particular, to detection of a failure.

Recently, the data amount treated by an information processing system has been significantly increased. A storage device of a large capacity should assure an I/O performance and reliability to match the storage capacity. For this, there has been developed one for multiplexing the logical path (I/O path) to the storage device and allocating to the logical path the data input/output request (I/O request) to the storage device.

As such a technique, there is one for improving the reliability of the system including a computer and a storage device connected by a plurality of paths by selecting a path having less possibility of failure after calculating the possibility of the failure for each path from the number of I/O requests to the path. (For example, U.S. Pat. No. 6,802,021.)

It is possible to improve the reliability by using a configuration for selecting one of the paths according to generation of a failure or the possibility of generation of a failure.

However, when an I/O request is assigned to a path excluding the path where failure has occurred or an I/O request is assigned to a path having a low possibility of generation of a failure so as to improve the reliability, the I/O requests are concentrated to the path, which in turn lowers the throughput.

In a system having a configuration including an information processing device such as a computer and a storage device which are connected by a plenty of paths, various methods are used as a method for storing data in the storage device. For example, data mirroring is performed for dually storing data when the data is very important. Furthermore, when performing the mirroring, there are methods for controlling the mirroring by the storage device or by the information processing device.

SUMMARY OF THE INVENTION

It is therefore an object of the present invention to more improve the throughput of the I/O request in a configuration for controlling the mirroring by an information processing device.

For this, in a system including an information processing device and a plurality of logical units (storage areas) set in a storage device which are connected by logical paths (access paths), a data write request is issued from the information processing device to the logical units so that a logical unit as a read request object is selected according to the path state.

Moreover, in a system including an information processing device and a plurality of logical units (storage areas) set in a storage device which are connected by logical paths (access paths), upon detection of generation of a failure in a logical path, another logical path sharing a part of the logical path containing the failure is specified, so that an I/O request is assigned to a path other than the logical path having the failure and the specified logical path.

According to the present invention, it is possible to improve the throughput for the access request.

Other objects, features and advantages of the invention will become apparent from the following description of the embodiments of the invention taken in conjunction with the accompanying drawings.

BRIEF DESCRIPTION OF THE DRAWINGS

FIG. 3 shows an example of an LU management table.

FIG. 6 shows an example of a path table.

FIG. 9 shows an example of a path failure table.

FIG. 11 shows an example of an operation statistic table.

DETAILED DESCRIPTION OF THE EMBODIMENTS

Description will now be directed to embodiments of the present invention with reference to the attached drawings.

Figure 1:
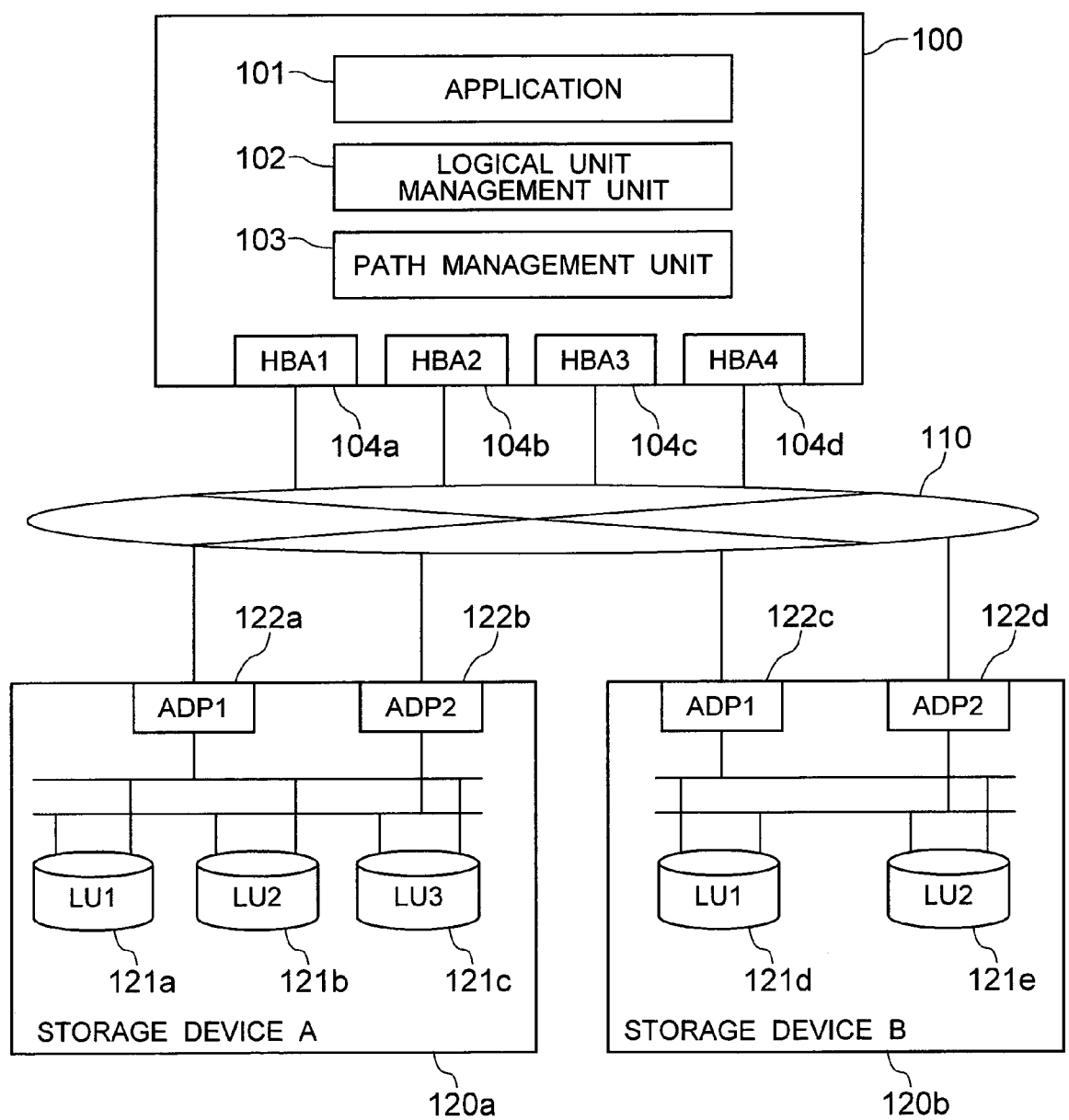
FIG. 1 is a block diagram showing an example of the entire configuration of an information processing system.

FIG. 1 is a block diagram showing an example of configuration of the information processing system.

The information processing system includes an information processing device 100 and a storage device 120. It should be noted that the information processing system may include two or more information processing devices.

The information processing device 100 is connected to the storage device 120 via SAN (Storage Area Network) 110. Communication via the SAN between the information processing device 100 and the storage device 120 is normally performed according to the fibre channel protocol. It should be noted that the information storage device 100 may be connected to the storage device 200 by using other than the SAN. For example, it is possible to use a network such as a LAN or it is possible to directly connect them by using the SCSI (Small Computer System Interface).

The information processing device 100 is a computer (a personal computer, a work station, a main frame computer, etc.) having a CPU and a memory and executes various application programs. The information processing device 100 includes an application 101, a logical unit management unit 102, a path management unit 103, a host bus adapter (HBA) 104, and the like.

The HBA 104 is, for example, an HBA (Host Bus Adapter) of an SCSI adapter or the fibre channel adapter. One or more HBA 104 are arranged in the information processing device 100 and communicate with the storage device 120 via the SAN 110. In the example of FIG. 1, four HBA 104 are arranged in the information processing device 100. Here, the HBA1, HBA2, HBA3, HBA4 are HBA 104 having the HBA identifiers (HBA-ID) "1", "2", "3", and "4". The information processing device 100 can communicate with the storage device by using any of the HBA 104.

The storage device 120 is, for example, a disk array device having a plurality of disk drives and a controller (not depicted) for controlling them. The storage device 120 includes one or more logical units (LU) 121.

The logical unit 121 is a unit which the information processing device 100 recognizes as one disk drive. The logical unit 121 is logically one disk drive but physically, it may be a partial area of a disk drive or a partial or entire area of a plurality of disk drives. In the example of FIG. 1, three logical units 121 are set in the storage device A 120a while two logical units 121 are set in the storage device B 120b. Here, LU1 to LU3 of the storage device A 120a are logical units 121 having the LU identifiers (LU-ID) "0101" to "0103". Moreover, the LU1 and LU2 of the storage device B 120b are logical units 121 having the LU identifiers (LU-ID) "0201" and "0202".

The storage device 120 further includes one or more adapters (ADP) 122. The ADP 122 communicates with the information processing device 100 via the SAN 110. In the example of FIG. 1, the storage device 120 includes two ADP 122. Here, the ADP1 and ADP2 of the storage device A 120a are ADP 122 having ADP identifiers (ADP-ID) "0101" and "0102". Moreover, the ADP1 and the ADP2 of the storage device B 120b are ADP 122 having the ADP identifiers (ADP-ID) "0201" and "0202". The storage device 120 can communicate with the information processing device 100 by using any of the ADP 122.

The ADP 122 normally includes a cache memory (not depicted). When the ADP 122 receives a data read request from the information processing device 100 and if the read request object data exists in the cache memory, the ADP 122 returns the data in the cache memory to the information processing device 100 without accessing the logical unit 121. As a result, the access to the logical unit 121 (that is access of the disk drive constituting the logical unit 121) is omitted, thereby improving the access speed. It should be noted that a similar cache memory may be arranged in the HBA 104.

Each of the HBA 104 can communicate with any of the ADP 122. Similarly, each of the ADP 122 can communicate with any of the HBA 104.

Here, the "path" means a communication path from the information processing device 100 to the logical unit 121 or a data access path. In the example of FIG. 1, since two ADP 122 are arranged for the four HBA 10-4 and the one storage device, there are eight paths from the information processing device 100 to one logical unit 121 of the storage device A 120a. The path is identified by the path ID. The path ID is determined by the identifiers of the HB A 104, the ADP 122, and the LU 121 (HBA-ID, ADP-ID, LU-ID) through which the path goes. For example, the path ID of the path going through the HBA1 and the ADP1 of the storage A is "101010102".

Access to the data stored in the storage device 120 from the information processing device 100 is performed, for example, by an I/O request such as a data write request or a data read request. The I/O request is issued by various applications 101. In the I/O request issued by the application 101, a header, a storage device, an LU management ID, an address, and the like are specified. The header contains the identifier of the information processing device 100 which transmits the I/O request. The storage device contains the identifier of the storage device to which the I/O request is performed. The LU management ID is the identifier specified for managing the logical unit by the logical unit management unit 12 as will be detailed later. The LU management ID contains the identifier. The address contains the start position (start address) such as a data read out or write in start position. It should be noted that when the I/O request is a data write request, data to be written into the I/O request is added.

The logical unit management unit 102 manages the logical unit which can be accessed by the information processing device 100, by using the LU management ID. Thus, by assigning the same LU management ID to two logical units, it is possible to obtain a pair of the logical units.

When the logical unit management unit 102 receives an I/O request, it issues an I/O request which has been updated to the LU-ID of the logical unit specified by the LU management ID. That is, an I/O request (header, storage device, LU management ID, address, . . . ) is updated to an I/O request (header, storage device, LU-ID, address, . . . ). When the I/O request is a write request and there are two logical units specified from the LU management ID, the logical unit management unit 102 generates an I/O request for each of the logical units. Thus, the same data is written into the two logical units and data mirroring is performed.

On the other hand, when the I/O request is a read request and there are two logical units specified from the LU management ID, an I/O request is issued only to one of the logical units. The logical unit management unit 102 manages the two logical units constituting a pair as a primary and a secondary unit. A write request is issued to the primary and the secondary logical unit while a read request is issued to the primary logical unit.

The I/O request issued from the logical unit management unit 102 is distributed (for example, equally assigned) to each path by the path management unit 103 and transmitted to the storage device 120. Thus, by processing a plurality of I/O requests in parallel, it is possible to improve the performance of the information processing system.

Upon detection of a path failure of one of the logical units constituting the pair, the information processing device 100 capable performing data mirroring sets the logical unit having more normal paths as the primary. In other words, when the number of normal paths of the secondary unit is greater than the number of the normal paths of the primary unit, the primary and the secondary of the logical units are switched. Thus, even when a path of the primary logical unit has failed, there are a plenty of paths to be assigned, it is possible to reduce the lowering of the throughput.

Figure 2:
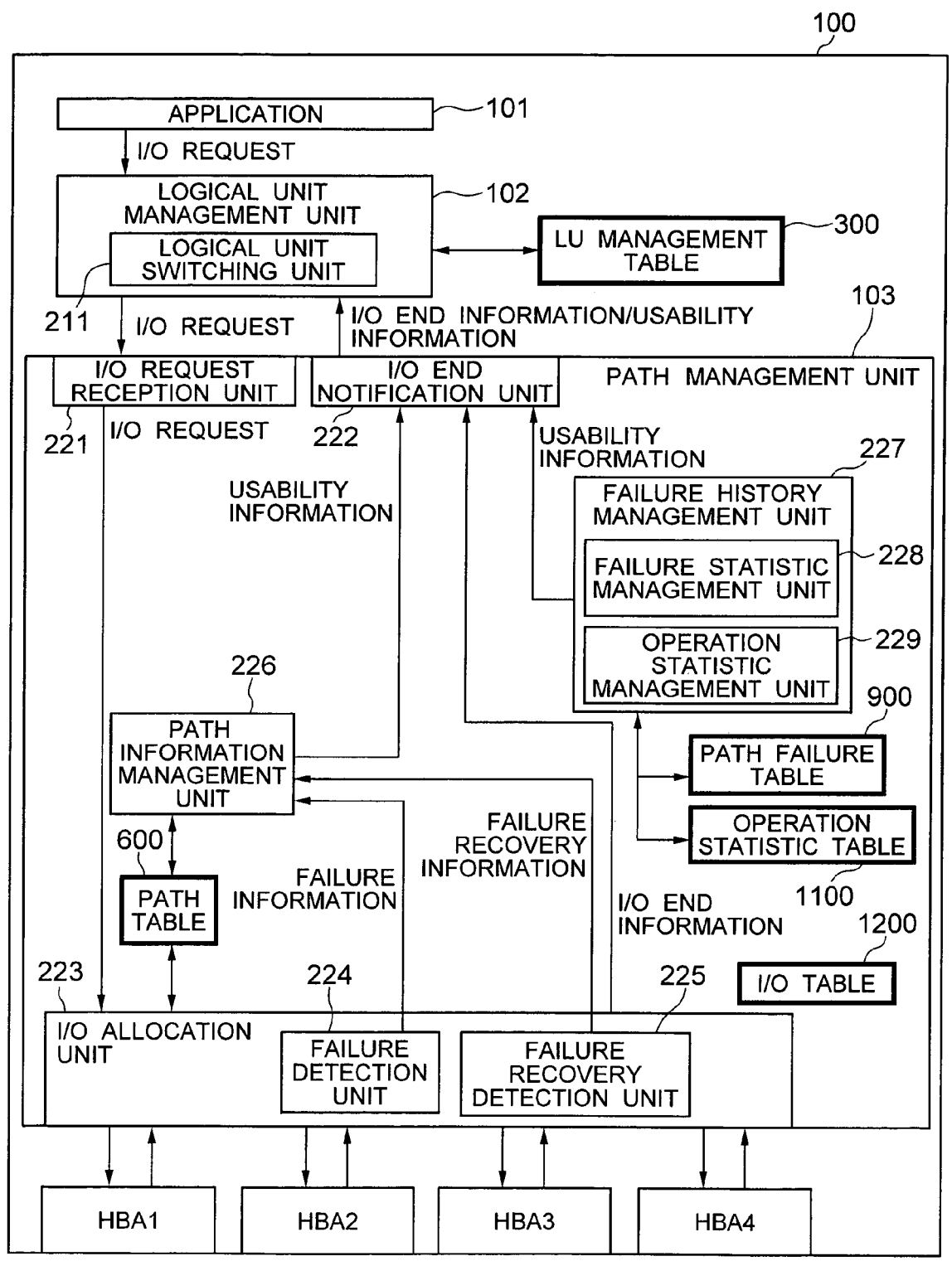
FIG. 2 is a block diagram showing an example of a logical unit management unit and a path management unit.

FIG. 2 shows details of the logical unit management unit 102 and the path management unit 103.

Here, the LU management table 300, the path table 600, the path failure table 900, the operation statistic table 1100, and the I/O table are stored in the memory of the information processing device 100. FIG. 2 shows how these tables are managed.

Figure 3:
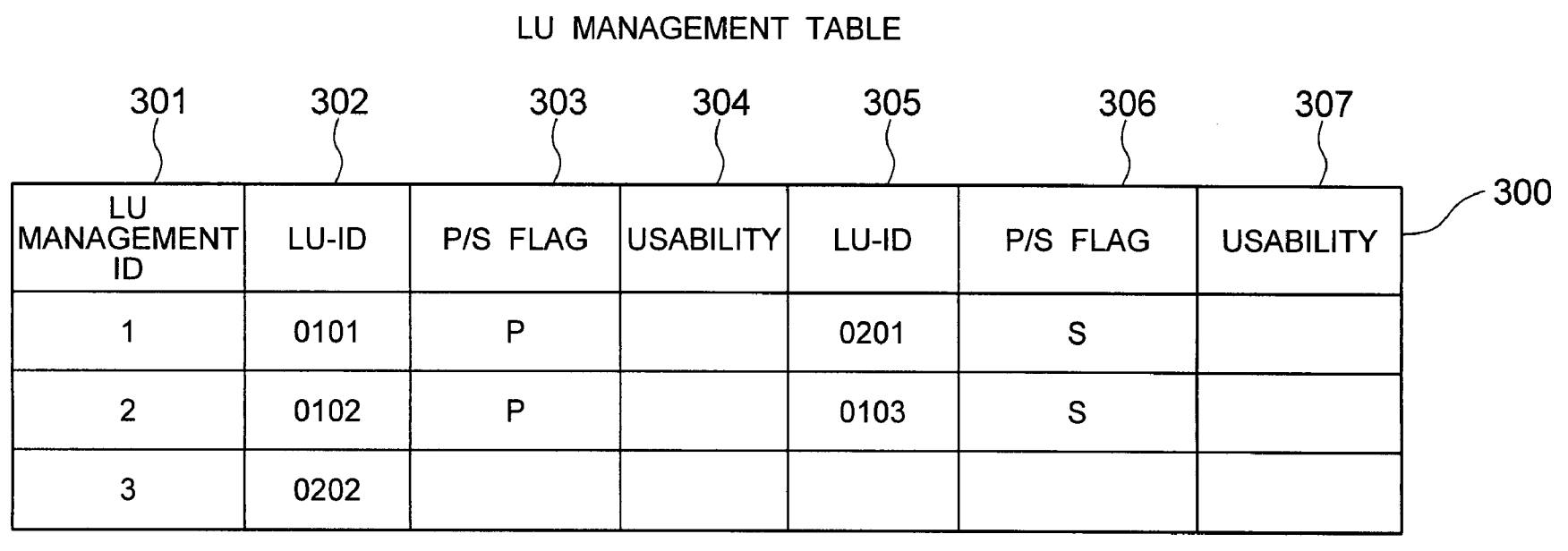

The logical unit management unit 102 manages the LU management table 300 (FIG. 3). When the logical unit management unit 102 receives an I/O request from the application 101, it searches the LU management table 300 by using the LU management ID contained in the I/O request and specifies the logical unit 121 to be accessed. In the LU management table 300, the LU-ID of the logical unit 121 is registered, and when a pair is constituted, the logical unit 121 is set as the primary or the secondary.

When the logical unit to be I/O-requested constitutes a pair, the logical unit management unit 102 generates an I/O request for each of the primary and the secondary logical unit if the request is a write request and generates an I/O request for the primary logical unit if the request is a read request.

The logical unit switching unit 211 receives usability information on the logical unit 121 from the path management unit 103 and sets the logical units constituting the pair to the primary and the secondary. This will be detailed later.

The I/O request reception unit 221 of the path management unit 103 receives the I/O request issued by the logical unit management unit 102. The I/O end notification unit 222 sends I/O end information or usable information indicating that the processing for the I/O request received by the I/O request reception unit 221 from the logical unit management unit 102, to the logical unit management unit 102.

The I/O allocation unit 223 assigns the I/O request received from the I/O request reception unit 221 to an appropriate path. Upon reception of an I/O request, the I/O allocation unit 223 extracts a normal path (a path having "0" for the path failure information) for the logical unit to be I/O-requested from the path table (FIG. 6). It should be noted that the path table 600 contains all the path information of the HBA 104 and the logical unit 121.

The I/O assignment unit 223 determines a path from the selected normal paths so that the I/O requests are distributed equally to the paths by the load distribution function and assigns the I/O request. For example, the I/O request is assigned to a path which is not processing an I/O request or to the path which has completed the I/O request.

When the I/O allocation unit 223 receives the I/O end information indicating that the I/O request for the assigned path has been normally completed, it sends it to the I/O end notification unit 222. It should be noted that when the I/O request has not been terminated normally (when a failure is detected by the failure detection unit 224), the I/O allocation unit 223 extracts a normal path from the path table 600 and assigns an I/O request by the load distribution function.

Moreover, the I/O allocation unit 223 has the failure detection unit 224 and a failure recovery detection unit 225 and realizes the path state check function for detecting modification of the path state for the storage device by these functions. More specifically, the failure detection unit 224 detects a pass state modification when the user operates the path to the offline state (closed state in which the path has failed and an I/O request cannot be processed normally) or when a path failure is detected during processing of an I/O request, and notifies the failure information including the path ID to the path information management unit 226. Moreover, the failure recovery detection unit 225 detects recovery of the path failure and notifies the failure recovery information to the path information management unit 226. More specifically, the failure recovery detection unit 225 periodically performs an I/O processing to the path where a failure has been detected by the failure detection unit 224, and checks whether normal processing has been performed to determine whether the failure has been recovered. When the normal processing has been performed, the failure recovery detection unit 225 notifies the failure recovery information including the path ID to the path information management unit 226.

When the path information management unit 226 receives failure information or failure recovery information, it updates the path table 600. More specifically, when failure information is received, "1" is set for the path failure information corresponding to the path ID from the path ID contained in the failure information. When failure recovery information is received, "0" is set for the path failure information corresponding to the path ID from the path ID contained in the failure recovery information.

Next, the path information management unit 226 references the path table 600 and determines the number of normal paths for the logical unit in which the path failure information has been modified and sends usability information including the LU-ID and the number of normal paths for the LU-ID, to the I/O end notification unit 222.

The I/O end notification unit 222 sends the access end information received from the I/O allocation unit 223 or the usability information received from the path information management unit 226 to the logical unit switching unit 211.

The logical unit switching unit 211 of the logical unit management unit 102 searches the LU management table 300 and judges whether the unit is a logical unit constituting a pair from the LU-ID contained in the usability information. When the logical unit specified by the LU-ID contained in the usability information is judged to be one of the logical units constituting a pair, the number of normal paths of the respective logical units constituting the pair are compared to each other and the logical unit having a greater number of normal paths is registered (updated) as the primary logical unit in the LU management table 300. Moreover, the logical unit having a smaller number of the normal paths is registered (updated) as the secondary logical unit in the LU management table 300. Since the usability information is issued from the path management unit 103 when a failure is detected or the failure is recovered, the logical unit switching unit 211 switches the logical units constituting a pair between the primary and the secondary each time a failure occurs or the failure is recovered.

Since the primary logical unit has a higher access frequency as compared to the secondary logical unit, one having more paths to be assigned is set to be the primary logical unit. Thus, it is possible to reduce lowering of the throughput or the generation of trouble that the logical unit cannot be accessed.

Moreover, when specified by a user or by a predetermined cycle, the path management unit 103 can issue usability information according to the past failure generated in the path and the past load generated in the path by the access request.

In the I/O table 1200, an I/O request issued from the I/O assignment unit 223, a response to the I/O request, failure information detected by the failure detection unit 224, an I/O request issued from the failure recovery detection unit 225, a response to the I/O, and the like are registered together with the time information.

The failure statistic management unit 228 analyzes the failure (instantaneous error, accumulated error) from the I/O request registered in the I/O table 1200 and a response to the I/O request and generates a pass failure table 900 (FIG. 9).

Moreover, from the I/O request registered in the I/O table 1200, the operation statistic management unit 229 generates an operation statistic table 1100 (FIG. 11) by using the data amount transmitted to the path used in the I/O processing and the time required for the I/O processing. Furthermore, the operation statistic management unit 229 references the generated operation statistic table 1100, specifies a path judged to have deteriorated performance, and registers it as a performance error in the path failure table 900.

The failure history management unit 227 calculates safety for each of the logical units from the error information registered in the path failure table 900 and sends the LU-ID and safety of the logical unit as usability information to the I/O end notification unit 222. It should be noted that the safety will be detailed later.

When the usability information received from the I/O end notification unit 222 relates to a logical unit constituting a pair, the logical unit switching unit 211 sets the logical unit having a higher safety as the primary logical unit and the logical unit having a lower safety as the secondary logical unit.

Since the LU management table 300 is updated by the usability information received from the failure history management unit 227, the failure history management unit 227 instructs to send an initial value to the path information management unit 226. Thus, the path information management unit 226 references the path table 600 sends the LU-ID of each logical unit and the number of normal paths for each logical unit as an initial value to the logical unit switching unit 211.

For example, before executing the processing of the application 101, the primary logical unit and the secondary logical unit are set by the usability information which is a load of each path from the failure history management unit 227, and after the processing of the application 101 is started, operation is performed by switching the logical units from the primary to the secondary or from the secondary to the primary according to the usability information from the path information management unit 226.

FIG. 3 shows an example of the LU management table.

The LU management table 300 is a table which is stored in the memory of the information processing device 100 and contains definition of the logical unit 121 which can be handled by the information processing device 100. The LU management ID 301 is an identifier for managing the logical unit and the IO request of the application 101 specifies this LU management ID. The LU302, 305 are identifiers of the logical unit. Here, when two LU-ID's are defined for the same LU management ID, the logical unit has the pair configuration or the configuration in which the same data is written for the write IO request (mirroring). In FIG. 3, the logical unit having the LU-ID "0101" and the logical unit having the LU-ID "0201" have the LU management ID "1". That is, the LU1 of the storage device A and the LU2 of the storage device B are defined so as to constitute a pair. Similarly, for the LU management ID "2", the LU2 and the LU3 of the storage device A are defined so as to constitute a pair. For the LU management ID "3", one logical unit is defined. In the example of FIG. 3, two logical units can be defined for one LU management ID. However, it is possible to define three or more logical units. Moreover, in this embodiment, the LU-ID is uniquely defined in the information processing system. However, it is also possible to define it uniquely in the storage device. In such a case, the same LU-ID may be defined between different storage devices. Accordingly, the LU management table 300 also defines the identifier of the storage device. The LU-ID 302, 305, the initial values of the P/S flags 303, 306 are set by the user or another program.

When two or more logical units are defined for the LU management ID, the P/S flags 303, 306 define whether the logical unit is the primary (P) or the secondary (S). When the I/O request is a write request, the primary/secondary logical units become objects and when the I/O request is a read request, the primary logical unit becomes an object.

In the column of usability 304, 307, the number of normal paths contained in the usability information sent from the path management unit 103 and safety are registered. Normally, the number of normal paths sent from the path information management unit 226 is registered. The initial values of the column of usability 304, 307 are set by the path information management unit 226. More specifically, when the path management unit 103 starts, the path information management unit 226 references the path table 600 and sends the LU-ID and the number of normal paths for the LU-ID as initial values to the logical unit management unit 102. The logical unit management unit 102 registers the number of normal paths as usability of the LU-ID received, in the LU management table 300.

Figure 4:
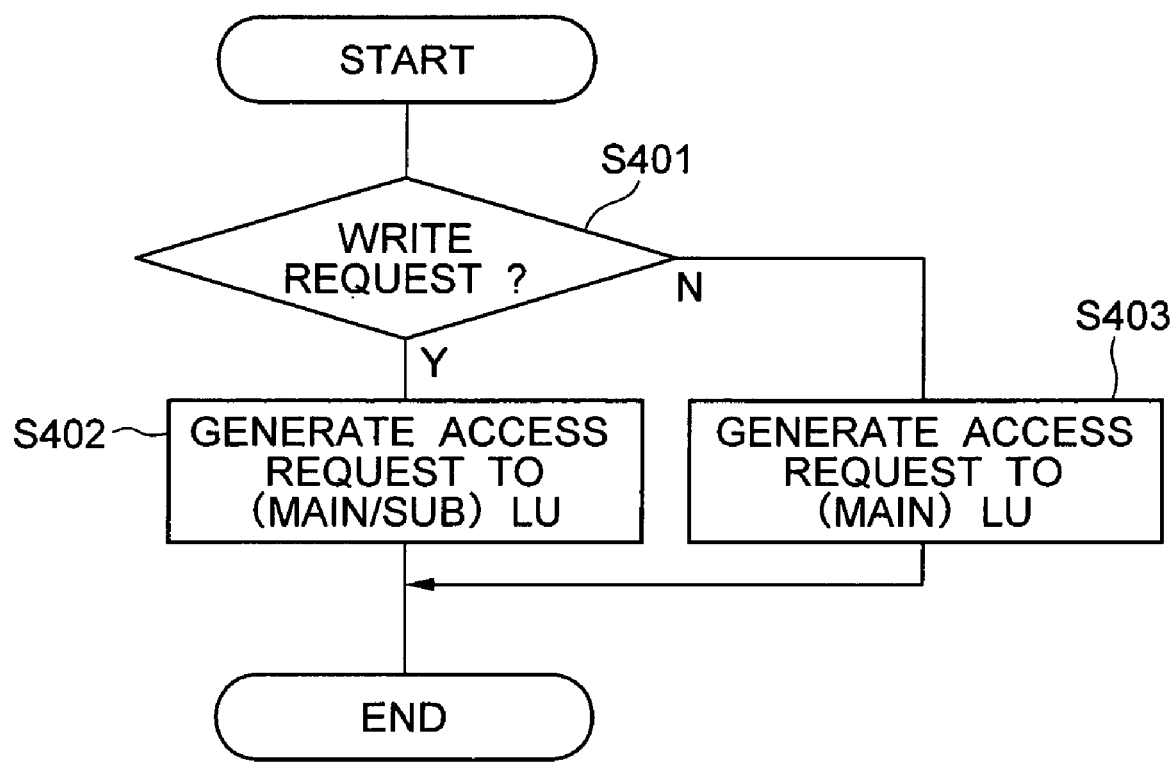
FIG. 4 is a flowchart showing an example of processing of the logical unit management unit.

FIG. 4 is a flowchart showing an example of processing of the logical unit management unit 102.

When the logical unit management unit 102 receives an I/O request from the application 101, it is judged whether the I/O request is a write request (S401). If Yes, the LU management table 300 is referenced and the LU-ID is read from the LU management ID contained in the I/O request. Moreover, an access request for the logical unit is generated and issued (S402). Here, if the logical unit has a pair configuration (when a plurality of logical units are defined for one LU management ID), an I/O request is generated and issued for the primary logical unit and the secondary logical unit.

On the other hand, if the I/O request received from the application 101 is a read request ("N" in S401), the LU management table 300 is referenced and the LU-ID is read from the LU management ID contained in the I/O request. Then, an access request for the logical unit is generated and issued (S403). Here, if the logical unit has a pair configuration (when a plurality of logical units are defined for one LU management ID), an I/O request for the primary logical unit is generated and issued.

Thus, the same data is written (mirroring) to the primary logical unit and the secondary logical unit. Moreover, read out is performed from the primary logical unit.

Figure 5:
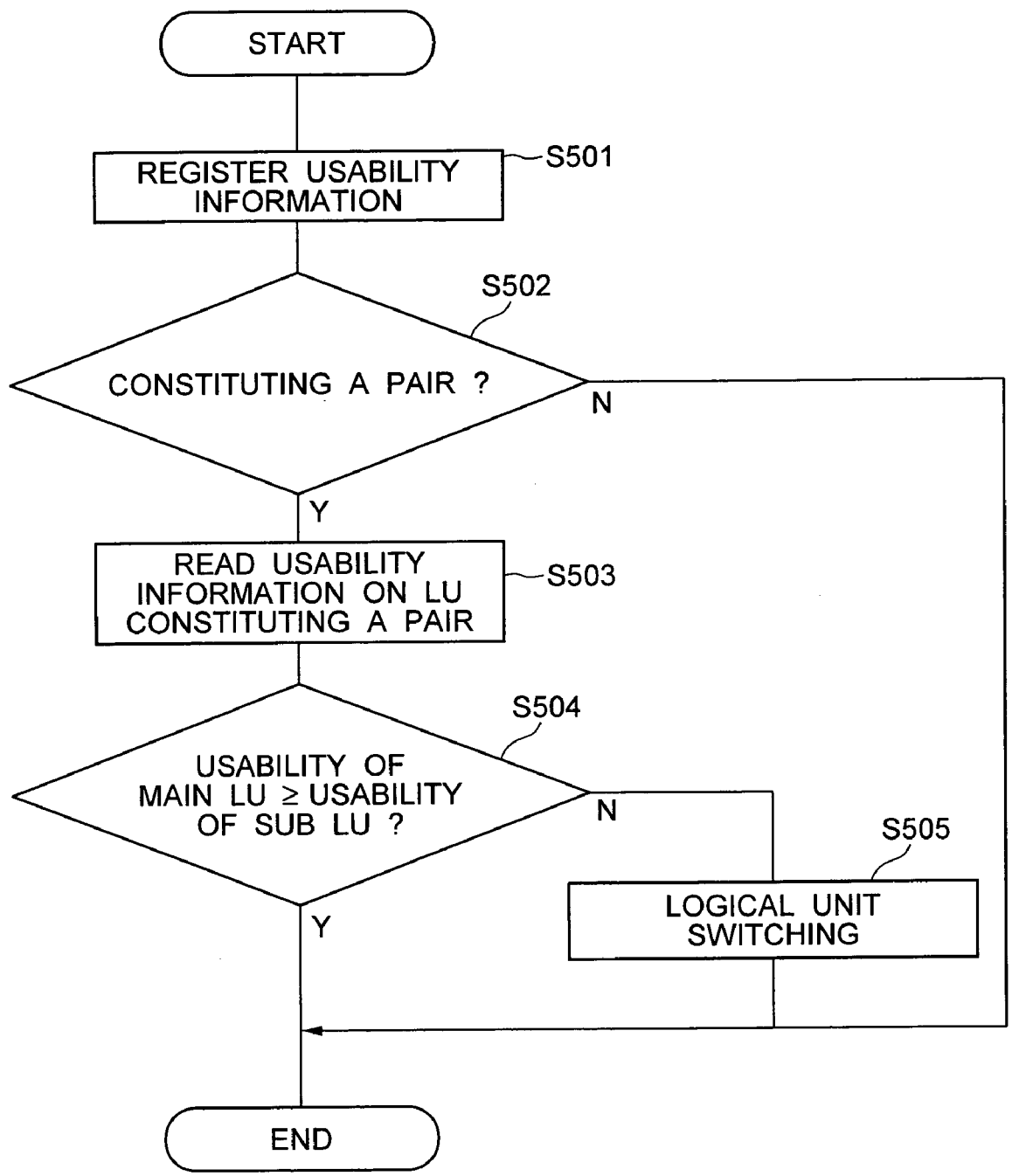
FIG. 5 is a flowchart showing an example of processing of a logical unit switching unit.

FIG. 5 is a flowchart showing an example of processing of the logical unit switching unit 211.

When the logical unit switching unit 211 receives usability information from the path management unit 103, it registers the information in the LU management table 300. More specifically, the number of normal paths contained in the usability information is registered in the column of usability 304 or 307 corresponding to the LU-ID contained in the usability information (S501). Next, the LU management table 300 is referenced to judge whether the logical unit containing the number of normal paths constitutes a pair (S502). If no pair is constituted, the processing is terminated.

On the other hand, if a pair if constituted ("Y" in S502), the usability of the logical unit constituting the pair is read from the LU management table 300 and the usability of the primary logical unit is compared to the usability of the secondary logical unit (S504). More specifically, the number of normal paths of the primary logical unit is compared to the number of normal paths of the secondary logical unit. If the usability of the secondary logical unit is greater than the usability of the primary logical unit ("N" in S504), switching is performed between the primary logical unit and the secondary logical unit (S505). More specifically, "P" is set for the P/S flag of the LU-ID judged to have a greater usability and "S" is set for the P/S flag of the LU-ID judged to have a smaller usability.

On the other hand, when the primary logical unit and the secondary logical unit have the same usability or when the primary logical unit has a greater usability ("Y" in S504), the processing is terminated without performing switching between the primary logical unit and the secondary logical unit.

Thus, when the logical units constitute a pair, the logical unit switching unit 211 sets the greater number of normal paths to the primary logical unit and the smaller number of normal paths to the secondary logical unit.

It should be noted that when three or more logical units are correlated to one LU management ID, the logical unit having the greatest usability is set to the primary and the other logical units are set to the secondary instead of performing the processing of steps 504 and 505.

It should be also noted that the usability information sent from a failure history management unit 227 is a safety ratio, which is processed similarly. That is, the greater value of safety ratio is set to the primary logical unit and the smaller value of the safety ratio is set to the secondary logical unit.

FIG. 6 shows an example of path table.

The path table 600 is a table stored in the memory of the information processing device 100 and contains information indicating the states of all the paths existing in the information processing system of FIG. 1 (that is, the information processing device 100 and the storage device 120 connected to it). The path table 600 shown in FIG. 6 is set by an administrator of the storage device or another program when the path management unit 103 is started. For example, the HBA 104 of the information processing device 100 detects the logical unit 121 and information on the logical unit 121 detected may be acquired by the operating system (OS) of the information processing device 100 from the HBA 104. The information processing device 100 can acquire information on the bus (for example, information indicating which HBA 104 uses the ADP 122) by using the SCSI command for the logical unit 121 detected. The information processing device generates the path table according to the information.

Moreover, the path table 600 of FIG. 6 shows a case when the HBA1 and HBA2 of the information processing device 100 are connected to the storage device A 120a while the HBA3 and HBA4 are connected to the storage device B 120b. It should be noted that it is also possible that the HBA1 to HBA4 are connected to the storage device A 120a and the storage device B 120b or the HBA1 is connected to the storage device A 120a and the HBA2 to HBA4 are connected to the storage device B 120b.

In the path table 600, the path number 601 indicates a path number uniquely assigned to all the paths. The HBA-ID 602 is an identifier (HBA-ID) of the HBA 104 where the path passes. The ADP-ID 603 is an identifier (ADP-ID) of the ADP 122 where the path passes. The LU-ID 604 is an identifier (LU-ID) of the logical unit 121 which the path reaches. The path failure information 605 indicates whether the path has failed. When no failure has occurred in any of the HBA 104, the ADP 122, and the logical unit 121 constituting the path, the value of the path failure information 605 is set to "0". On the other hand, if a failure has occurred in one of them, the value of the path failure information 605 is set to "1".

Figure 7:
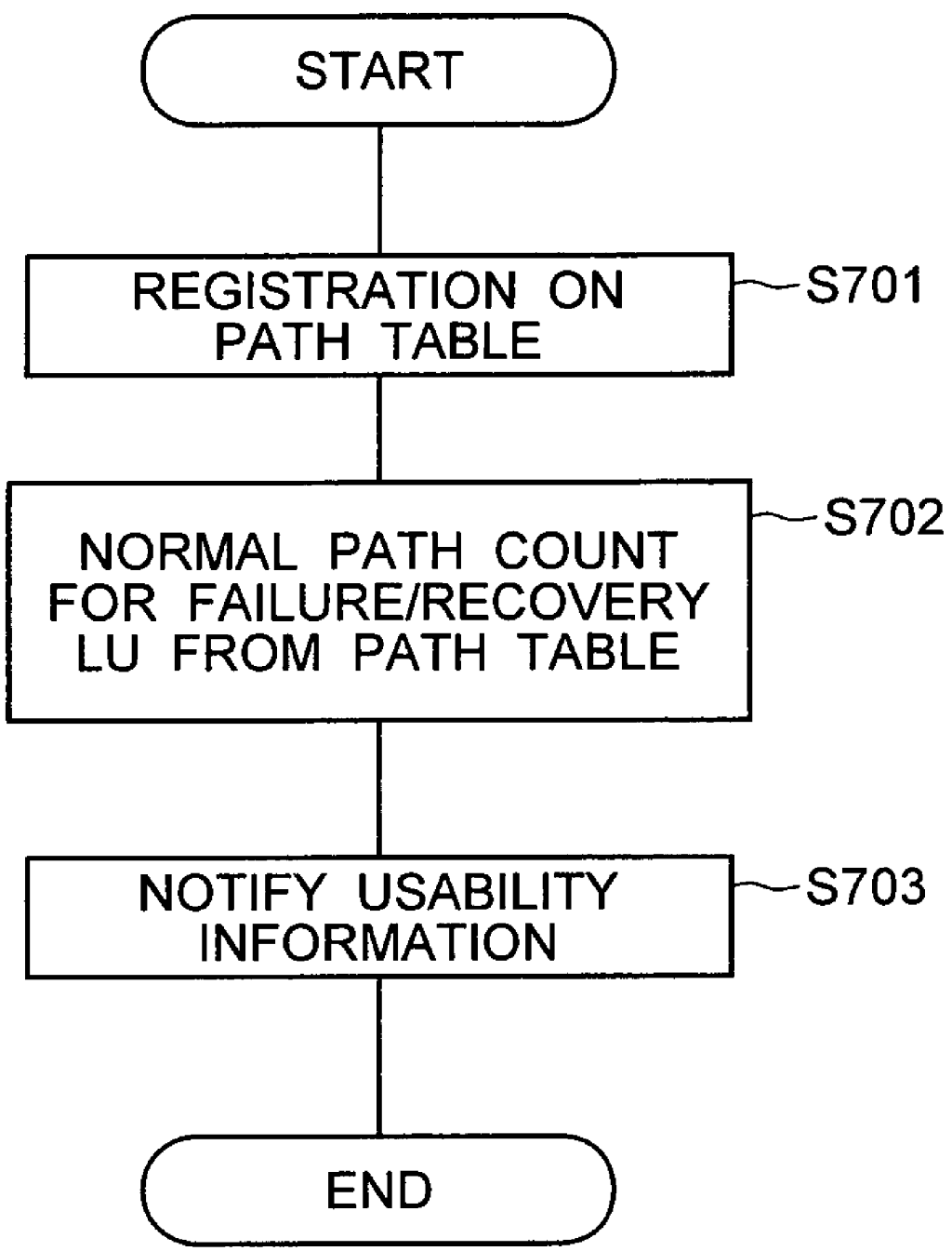
FIG. 7 is a flowchart showing an example of processing of a path information management unit.

FIG. 7 is a flowchart showing an example of processing of the path information management unit 226.

The path information management unit 226 starts processing when it receives failure information from the failure detection unit 224 or failure recovery information from the failure recovery detection unit 225.

When the path information management unit 226 receives failure information from the failure detection unit 224, it sets "1" in the path failure information 605 of the path table 600 from the path ID contained in the failure information (S701). Next, an LU-ID is identified from the path ID where a failure has occurred, and the number of normal paths is counted for the LU-ID (S702). The path information management unit 226 sends the LU-ID and the number of normal paths as usability information to the access end notification unit 222 (S703).

In the example of FIG. 6, the path information management unit 226 receives the failure information for the path ID "1" from the failure detection unit 224 and sets "1" to the path failure information having the path number "1". The path information management unit 226 counts the number of normal paths for the LU-ID "0101" of the path number "1". In this case, since the path number "2", "3" and "4" are normal, the number of normal paths is "3". The path information management unit 226 sends the LU-ID "0101" and the number of normal paths "3" as usability information to the access end notification unit 222.

It should be noted that when the path information management unit 226 receives a failure recovery notification from the failure recovery detection unit 225, "0" is set to the path failure information 605 of the path table 600 from the path ID contained in the failure recovery information (S701). Hereinafter, similarly as when failure occurrence information is received, an LU-ID is identified, the number of normal paths for this LU-ID is counted (S702), and the LU-ID and the number of the normal paths are sent as usability information to the I/O end notification unit 222 (S703).

Thus, each time the path state is modified by failure generation and failure recovery, the path information management unit 226 issues the LU-ID of the logical unit and the number of normal paths for the LU-ID. In this way, the logical unit switching unit 211 judges switching between the primary and secondary of the logical unit according to the generation of failure and recovery of failure.

The failure history management unit 227 analyzes the failure (instantaneous error, accumulated error, performance error) from the history information recorded in the I/O table 1200.

The instantaneous error is identified when an error has occurred in an I/O request in the same path but the next I/O request issued has terminated normally. The instantaneous error occurs by a wear-out of an optical fiber or instability of the power source, which in turn brings about instability of the transmission path.

The accumulated error is identified when a number of errors exceeding a predetermined value have occurred within a certain period (for example, in a month). It should be noted that instead of judging the accumulated error by the number of errors within a certain period, it is possible to identify an accumulated error when a predetermined number of errors have occurred without deciding the period for counting the number of errors. Moreover, the accumulated error may also be identified when the number of errors which have occurred within a predetermined number of successive access requests exceeds a predetermined number or when the a predetermined ratio of access requests have caused an error.

The performance error is identified when the performance is deteriorated by a predetermined value as compared to the state when the path is arranged. As will be detailed later, the operation statistic management unit 229 acquires the data amount and the processing time of the access processing and it is judged that a performance error has occurred when the response is deteriorated by 60% as compared to the initial setting.

Figure 8:
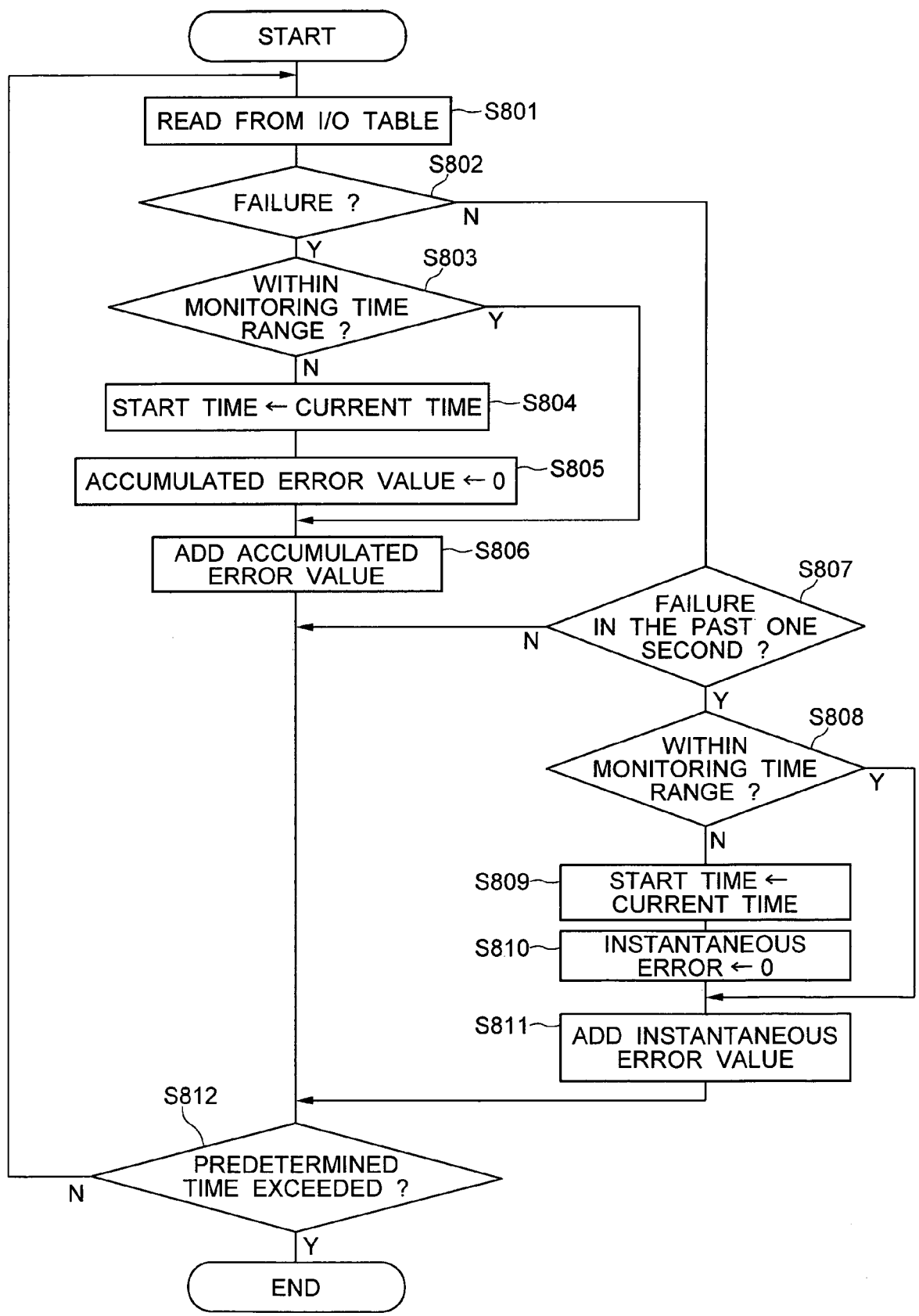
FIG. 8 is a flowchart showing an example of processing of a failure statistic management unit.

FIG. 8 is a flowchart showing an example of processing of the failure statistic management unit 228.

The failure statistic management unit 228 reads the response to the I/O request issued to each path (I/O end, failure) and registered in the I/O table, in the chronological order and counts the number of instantaneous errors and accumulated errors generated.

The failure statistic management unit 228 reads out the response to the I/O request from the I/O table (S801) and judges whether the response to the I/O request is a failure (S802). If the response is not a failure ("N" in S802), control is passed to step S807 without executing the processes associated with the accumulated error (S803 to S806). On the other hand, if the response is a failure ("Y" in S802), the processes associated with the accumulated error (S803 to S806) are executed.

In the process associated with the accumulated error, firstly, the start time and the monitoring period in the error of the accumulated error of the path in the path failure table are referenced and judgment is made whether the current time is within the monitoring time range, i.e., the failure has occurred within a predetermined monitoring time (S803). If the failure has occurred within the predetermined monitoring time, control is passed to Step S804 and the accumulated error detection value is incremented, there by terminating the process.

On the other hand, Step S803 judges that the failure has occurred at a time other than the predetermined monitoring time, the current time is set to the monitoring start time (S804) and the accumulated error detection value is set to "0" (S805), thereby starting a new monitoring time. The accumulated error detection value is incremented (S806) and the processing is terminated.

Next, control is passed to Step S807 where it is judged whether a failure is present in the process which has been executed during a predetermined instantaneous monitoring time (one second before in the example of FIG. 8) (S807). If it is judged that no failure has occurred one second before in the past, the processes associated with the instantaneous error (S808-S811) are not executed.

On the other hand, if it is judged that a failure has occurred during one second in the past, control is passed to Step 808, where the processes associated with the instantaneous error (S808-S811) are executed.

In the processes associated with the instantaneous error, firstly, the start time and the monitoring period in the accumulated error column of the path in the failure management table are referenced and it is judged whether the current time is in a predetermined monitoring time range, i.e., the failure has occurred within a predetermined monitoring time (S808). If the failure has occurred within the predetermined monitoring time, control is passed to Step S811, where the instantaneous error detection value is incremented by the number of an error (by one), thereby terminating the process.

On the other hand, if it is judged in Step 808 that the error has occurred at a time other than the predetermined monitoring time, the current time is set to the monitoring start time (S809) and the instantaneous error detection value is set to "0" (S810), thereby staring a new monitoring time. The instantaneous error detection value is incremented by the number of an error (by one) and the process is terminated.

It is judged whether the response to the I/O request read out from the I/O table 1200 exceeds a predetermined period (S812). If the predetermined period is exceeded, the process is terminated.

On the other hand, if the predetermined period is not exceeded, Step 801 reads out a response to the next I/O request and again performs the process.

FIG. 9 shows an example of the path failure table.

The path failure table contains the monitoring start time, monitoring period, judgment value, and detection value associated with the type of the error for each of the paths and for each of the error types.

For example, the instantaneous error is monitored during 30 days starting from year of 2003, Sep. 1$^{st}$, 10 o'clock, 20 minutes, 30.02 seconds. If an instantaneous error occurrence is detected during this monitoring period, the detection value is incremented by one and the failure management table is updated. Moreover, if instantaneous errors of the judgment value (20 times) are detected during the monitoring period, it is judged that the path is an instantaneous error.

It should be noted that since the performance error is determined by the average of the access processes, it is judged that a performance error has occurred if performance lowering is detected once. Accordingly, the monitoring period is not decided.

Figure 10:
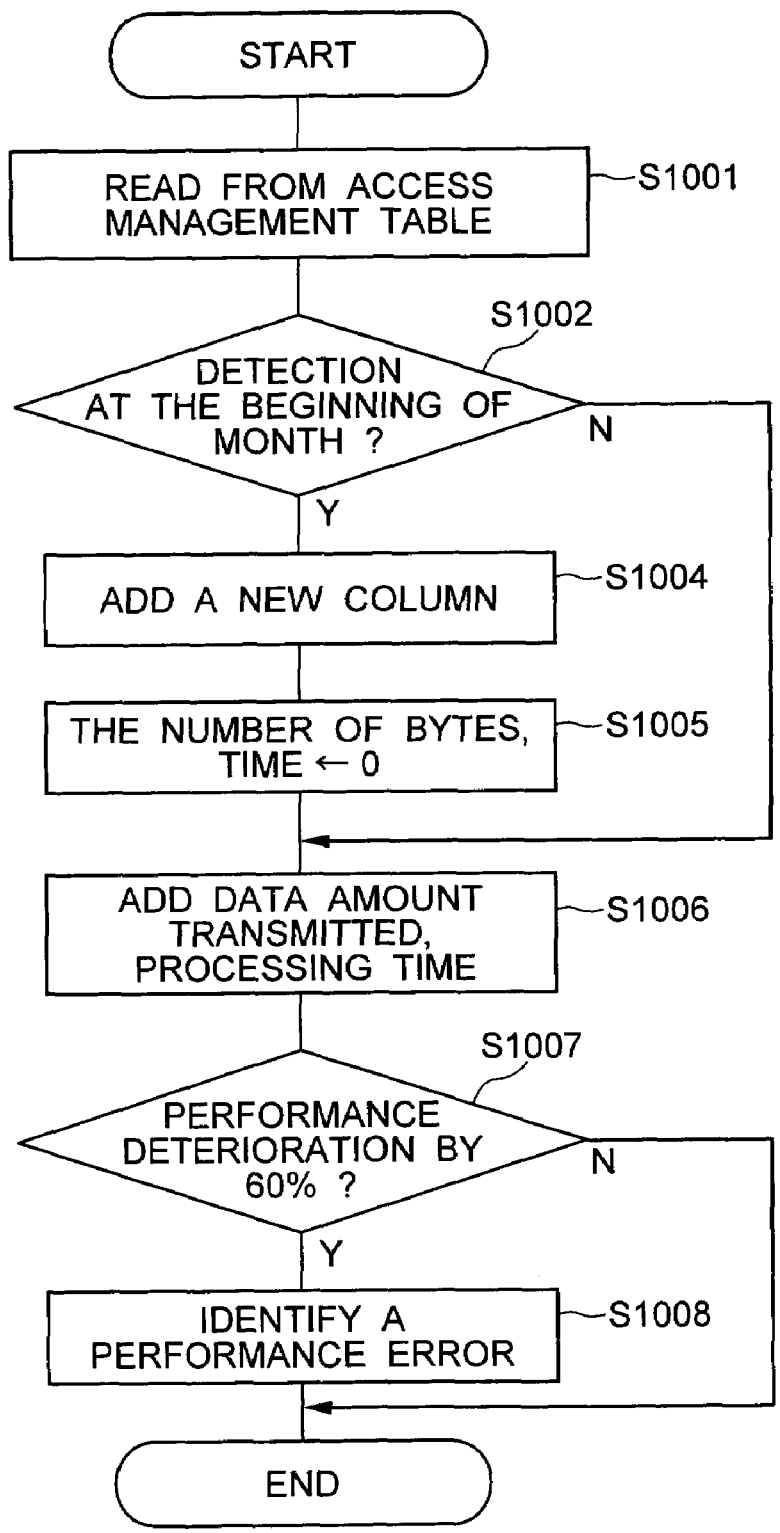
FIG. 10 is a flowchart showing an example of processing of an operation statistic management unit.

FIG. 10 shows an example of process of the operation statistic management unit.

Firstly, the I/O request data mount, the processing time required for the I/O request, and the I/O request time are read out from the I/O table 1200 (S1001).

Next, the date and time are acquired from the time information managed in the information processing device 100 and it is judged whether the date and time is a particular date and time (in the example of FIG. 10, first day of month and 0 o'clock) (S1002). If the date is other than the first day of the month, control is passed to Step 1006. On the other hand, if the first day of the month is detected, a column for recording the data of the new month starting in the operation statistic management table is added (S1004) and the data amount transmitted to the path in the access process and the time required for the I/O processing are initialized to "0" (S1005), thereby preparing monitoring of performance in a new period.

The data amount sent to the path used in the access processing which has terminated normally and the time required for the access are added to the corresponding column in the operation statistic table (S1006).

It is judged whether the performance is deteriorated by a predetermined ratio (60% in the example of FIG. 10). This judgment is performed periodically (once a month, for example) or when instructed by the user. If it is judged that the performance is deteriorated by 60%, a performance error is detected and "1" is added to the detection value of the performance error of the path failure table 900 (S1008), thereby terminating the processing. On the other hand, if the performance is not deteriorated by 60%, no performance error is detected and the processing is terminated.

It should be noted that in FIG. 10, the path performance (response of the access processing by the path) is calculated on month unit but an arbitrary period may be set for monitoring the performance.

FIG. 11 shows an example of the operation statistic management table.

The operation statistic management table contains the accumulated value of the data amount sent to the path by the access processing and the accumulated value of the time required for the access processing in the path. By dividing the accumulated data amount by the accumulation processing time, it is possible to obtain the response of the access processing of the monitoring time.

It should be noted that it is sufficient if the statistic management table contains the response of the period when the performance has been optimal (normally, upon installation), the accumulated value of the data amount of the access processing of the current monitoring period and the accumulated value of the time required for the access processing.

Moreover, in the operation statistic management table shown in FIG. 11, the data amount of access processing and the time required for the access processing are recorded for each month, but it is also possible to set another monitoring period for monitoring the path performance.

The failure history management unit 227 determines a failure for each of the paths from the path failure table 900 shown in FIG. 9. For example, the path 1 in FIG. 9 has a detection value of the instantaneous error exceeding the judgment value, Path 1 is determined to be an instantaneous error. Moreover, Path 2 had detection values not exceeding the judgment values, it is judged to be normal. Thus, each of the paths is determined to be an instantaneous error, an accumulated error, a performance error, or normal.

Next, the path for the logical unit is determined by referencing the path table 600. For example, for the LU-ID "0101", the path numbers "1", "2", "3", and "4" are identified. From the path numbers thus identified, the safety for the LU-ID is calculated. Here, "safety=a1×the number of normal paths−(a2×the number of instantaneous error paths+a3×the number of performance error paths+a4×the number of accumulated error paths)". Moreover, a1 to a4 are coefficients. It is assumed that 1=1, a2=0.1, a3=0.01, and a4=0.001. Thus, when all the paths are determined to be "normal", the safety becomes highest and when all the paths are determined to be "the instantaneous errors", the safety becomes lowest. Here, the coefficient of the instantaneous error is set to be greatest because the instantaneous error is caused when the optical fiber is worn out or the transmission path has become unstable due to the power source instability and the error cannot be removed easily. It should be noted that the coefficients can be set freely by the user. For example, it is possible to set a1, a2, a4 to "0" and a3 to "1", thereby calculating the safety for the performance error.

The failure history management unit 227 sends the safety thus determined and the LU-ID as usability information to the access end notification unit 222. Thus, in the logical unit switching unit 211, the one having the higher safety is switched tot the primary logical unit.

On the other hand, the usability of the LU management table 300 has been modified by the usability information received from the failure history management unit 227 and accordingly, the failure history management unit 227 instructs the path information management unit 226 to send an initial value. Upon reception of the instruction of the initial value notification from the failure history management unit 227, the path information management unit 226 references the path table 600 and sends the number of normal paths for each of the logical units as an initial value to the logical unit management unit 102. The logical unit management unit 102 updates the usability in the LU management table 300 by the initial value received.

The failure history management unit 227 can be executed by the user or from another program. Accordingly, it is possible to execute with a predetermined cycle. For example, it is possible to switch every hour between the primary and the secondary logical unit by the performance error as a load state of the path.

According to occurrence of failure and recovery of failure, the logical unit whose failure has occurred/been recovered and the number of normal paths are notified as usability information from the path information management unit. However, it is also possible to simply use the information on occurrence/recovery of failure (for example, "1" for occurrence of failure and "0" for recovery) and the logical unit whose failure has occurred/been recovered as the usability information.

In this case, if the usability information is "1" in Step 501, the logical unit switching unit 211 subtracts 1 from the usability of the logical unit. If the usability information is "0", 1 is added from the usability of the logical unit. When the logical unit which has been modifies constitutes a pair, the usability of the logical units constituting the pair is compared and the logical unit having the greater usability is set to the primary. Thus, the usability information is reliability of the logical unit and may be any information that can define the reliability.

As has been explained, a logical unit having paths having a larger number of normal paths, a smaller number of the performance error paths or the instantaneous error paths can be set to the primary logical unit. Thus, it is possible to improve the throughput for the I/O requests from the application.

Moreover, it is also possible to realize with the program executing the processing units shown in FIG. 2.

Next, explanation will be given on another embodiment.

Here, failure information is also set for the path associated with the path where a failure has occurred.

Figure 12:
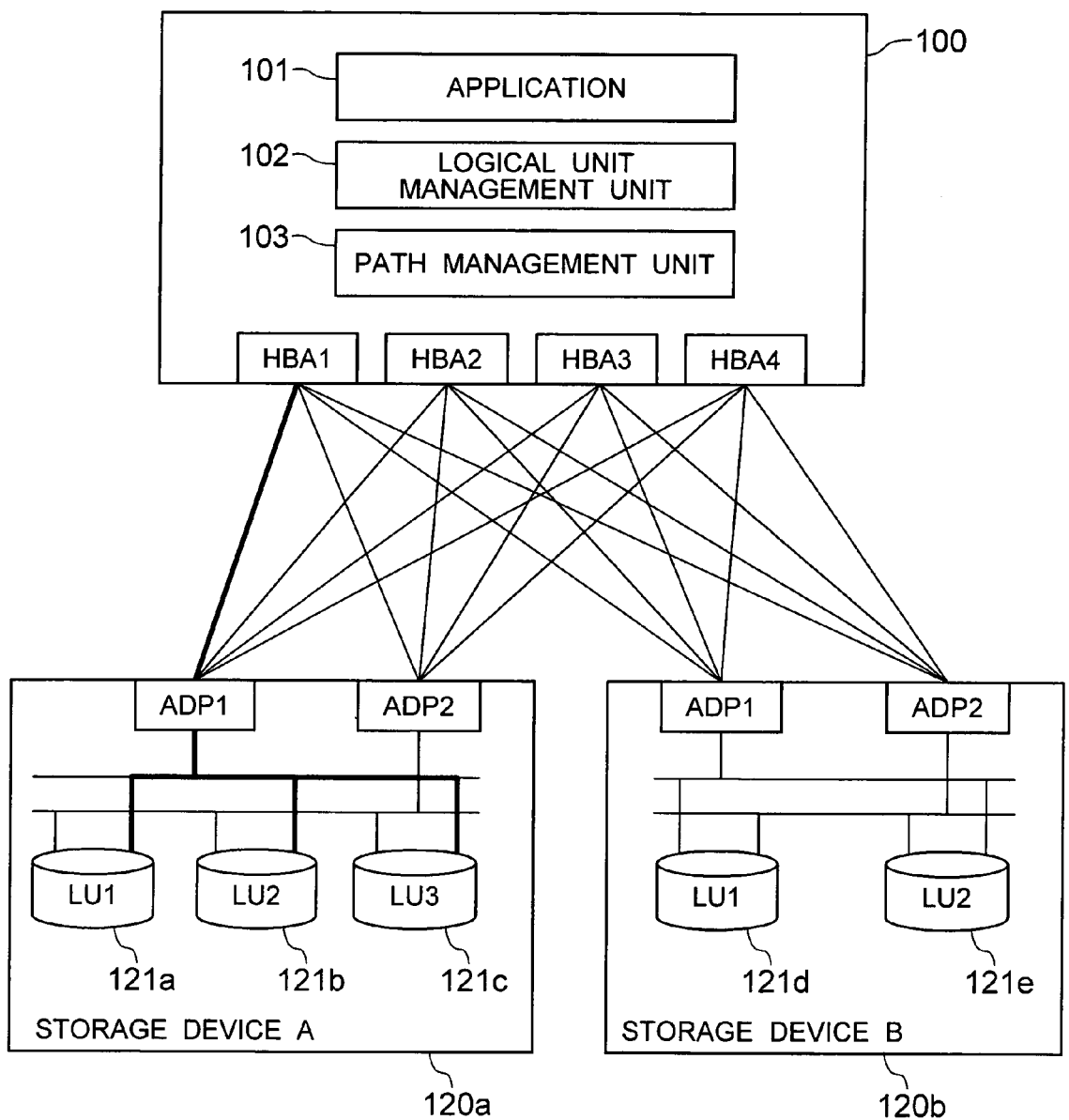
FIG. 12 is a block diagram showing an example of configuration of the information processing system.

FIG. 12 shows an example of the information processing system. FIG. 12 schematically shows the portion of SAN 110 in FIG. 1. Each HBA is connected to all the ADP of the storage devices A and B. It should be noted that it is also possible to make a connection to some of the ADP instead of all the ADP. Moreover, configuration of each component is identical to that of FIG. 1.

In this configuration, for example, if a failure is detected in the path for the HBA1, ADP1, LU1, it is assumed that the failure has also occurred in the path sharing the HBA1-ADP1 where the failure has occurred, i.e., the path of HBA-1ADP1-LU2 and the path of HBA1-ADP1-LU3. The path management unit 103 excludes the paths where the failure has occurred, selects a new path, and assigns an I/O request. That is, when failure has occurred in the path between HBA1-ADP1, issuance of N I/O request to the path is evaded. This can be realized by modifying the process of the path information management unit 226 of FIG. 2 as will explained below.

Referring to FIG. 2 and FIG. 12, explanation will be given on the processing performed when an I/O request is issued.

Upon reception of an I/O request from the logical unit management unit 102, an I/O allocation unit 223 of the path management unit 103 selects a normal path (path having "0" set in the failure information) from the path table 600. Here, it is assumed that a path for HBA1-ADP1-LU1 has been selected as the normal path. The I/O allocation unit 223 issues the I/O request to the path selected. Here, if the failure detection unit 224 detects a failure for the path, the failure detection unit 224 notifies the path ID selected as failure information to the path information management unit 226. The path information management unit 226 sets "1" for all the paths sharing the HBA and ADP from the path ID contained in the failure information. In this case, "1" is set to the failure information on the path for the HBA1-ADP1-LU1, the path for the HBA1-ADP1-LU2, and the path for the HBA1-ADP1-LU3 where the failure has occurred. Moreover, the path information management unit 226 reports the number of normal paths of the logical units having "1" set in the failure information as usability information to the logical unit switching unit 211. That is, the number of normal paths for each of the LU1, LU2, and LU3 is reported as usability information.

When the failure detection unit 224 detects a failure, it is judged that the I/O request has not terminated normally. The I/O allocation unit 223 references the path table 600 and selects a new path. In the path table 600, the failure information on the path where a failure has occurred and the path associated with the path where the failure has occurred is set to "1" by the path information management unit 226, and thus the path information management unit 226 selects a path other than this (path having "0" for failure information). It should be noted that as a candidate of the path to be selected, there are a path of HBA1-ADP2-LU1, HB2-ADP2-LU1, or the like. The I/O allocation unit 223 again issues the I/O request to the path selected. Moreover, when the I/O allocation unit 223 receives a new I/O request, it selects a path to be assigned from the normal path in the path table.

As has been described above, the failure recovery detection unit 225 issues an I/O request with a predetermined interval to the path having "1" set for the failure information. When the I/O request has terminated normally, the path ID of the I/O request which has terminated normally is reported as failure recovery information to the path information management unit 226.

As has been described above, the path information management unit 226 sets the path failure information to "0" from the path ID contained in the failure recovery information and reports the number of normal paths of the logical unit of the path as usability information to the logical unit switching unit 211.

For example, when a failure has occurred between the ADP1-LU1 among the three paths (HBA1-ADP1-LU1, HBA1-ADP1-LU2 and HBA1-ADP1-LU3) to which failure information is set and the other paths are normal, the I/O request to the HBA1-ADP1-LU2 and HBA1-ADP1-LU3 are terminated normally by the failure recovery detection unit 225. Accordingly, the path failure information on the HBA1-ADP1-LU2 and HBA1-ADP1-LU3 is set to "0". That is, when a failure has occurred between ADP-LU, identification of the path having the failure is narrowed down.

The processing of the logical unit switching unit 211 which has received the usability information is identical to the one which has been already explained.

Figure 13:
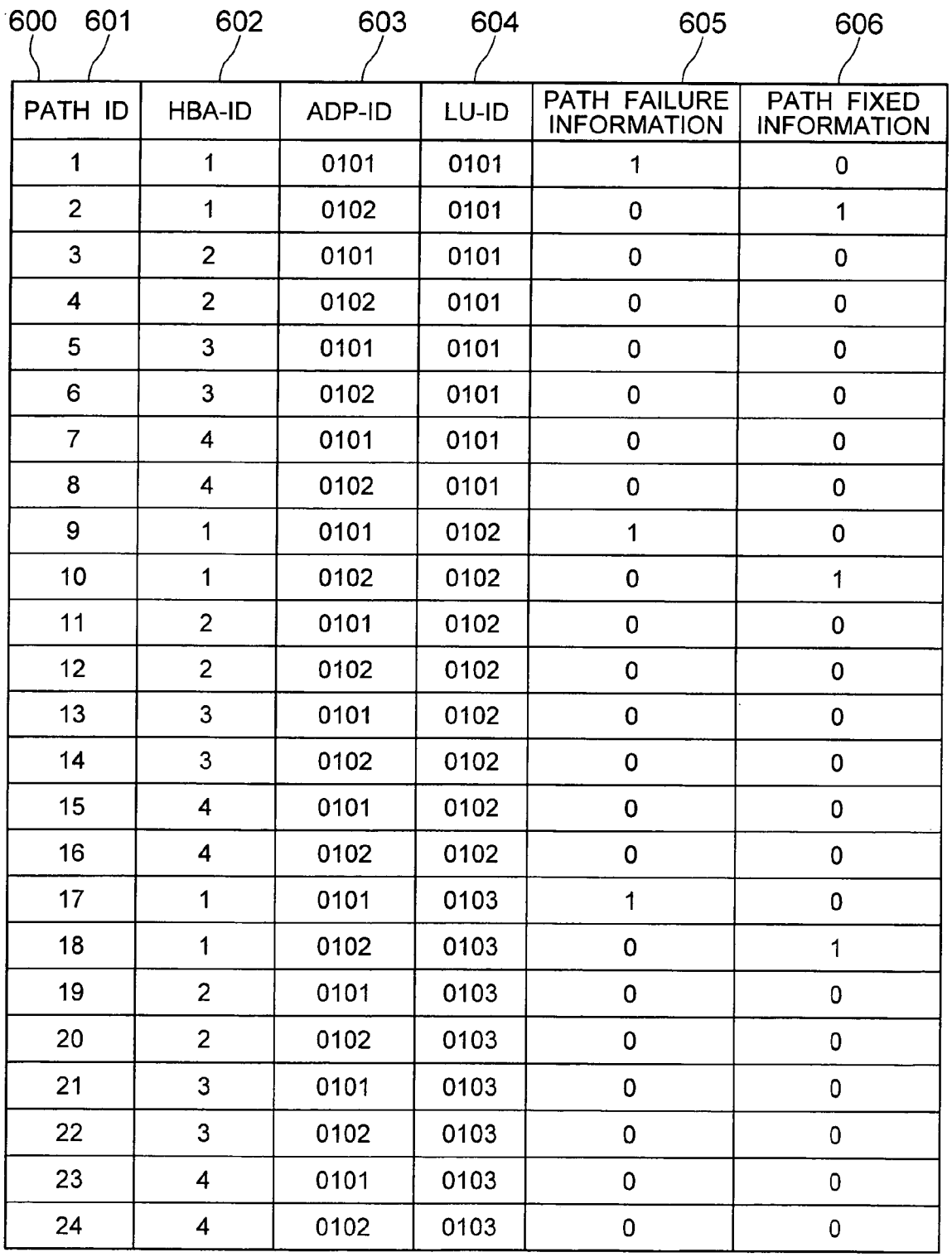
FIG. 13 shows another example of the path table.

FIG. 13 shows an example of the path table. This path table shows only the path portion for the information processing device 100 and the storage device A 120*a*. The path of the information processing device 100 and the storage device B 120*b* is also stored in the memory of the information processing device 100. When counting the number of the normal paths, all the paths stored in the information processing device 100 are referenced. The difference from the table shown in FIG. 6 is that path fixing information 606 is provided. When no normal path is available, this path fixing information 606 means that the path is an object of allocation by the I/O allocation unit 223 even if failure information is set in the path. The path fixing information 606 is set by the user.

Figure 14:
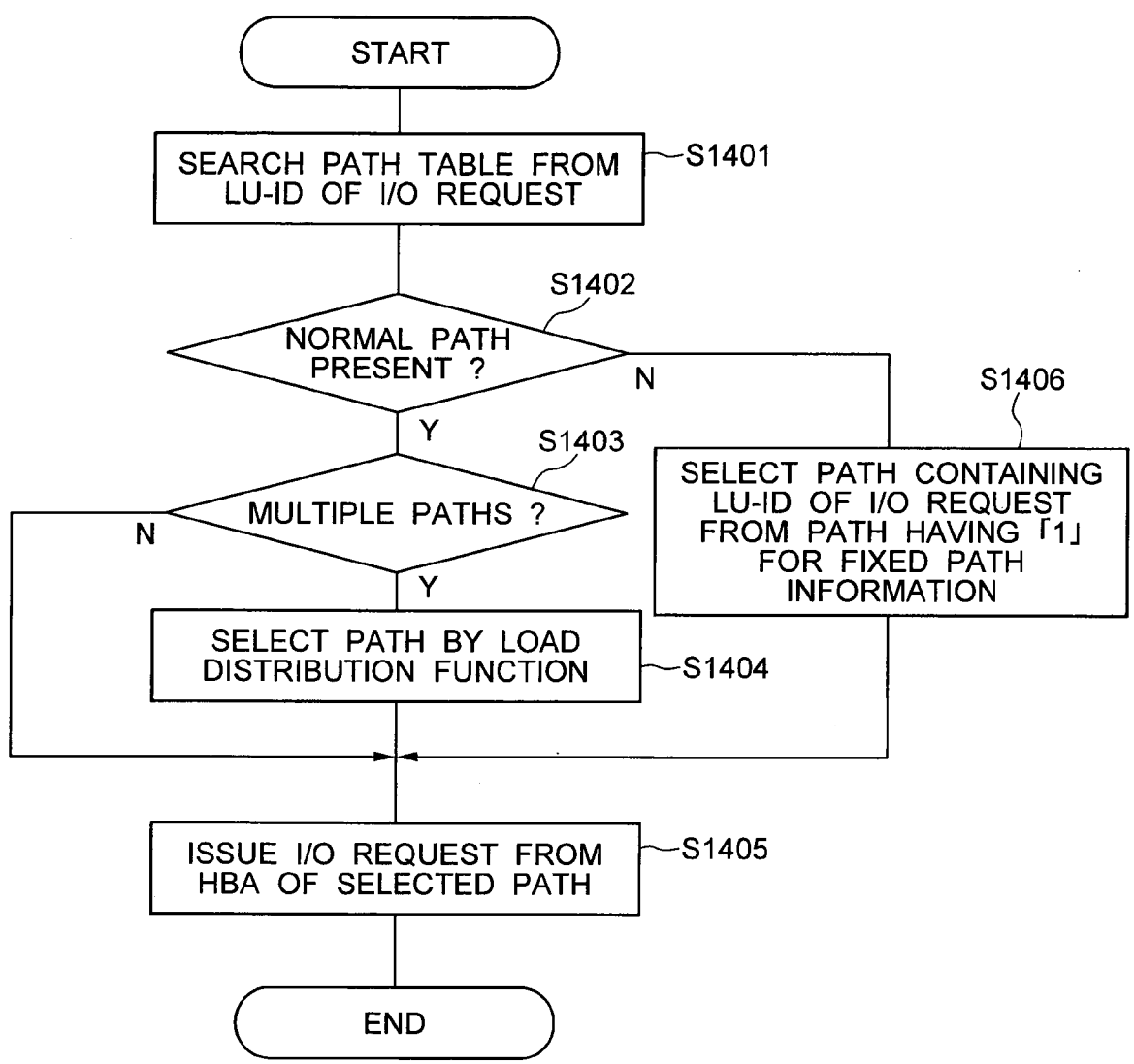
FIG. 14 is a flowchart showing an example of processing of I/O assignment.

FIG. 14 shows an example of path selection processing in the I/O allocation unit 223.

The I/O allocation unit 223 which has received an I/O request is a path including the LU-ID contained in the I/O request from the path table 600 and searches a path (normal path) having "0" for the path failure information 605. It is judged whether the path is normal (S1402). If the path is judged to be normal, it is judged whether a plurality of paths are provided (S1403). If a plurality of paths are provided, one of the paths is selected by the load distribution function (S1404) and an I/O request is issued from the HBA of the selected path (1405). On the other hand, if no normal path is available ("N" in S1402), the path includes the LU-ID contained in the I/O request. The one having "1" for the path fixing information 606 is selected (S1406) and an I/O request is issued from HBA of the selected path (S1405).

Moreover, when only one normal path is selected ("N" in S1403), an I/O request is issued from the HBA of the path (S1405). It should be noted that this processing is subjected to failure detection by the failure detection unit 224 and executed when the I/O request is issued again.

Figure 15:
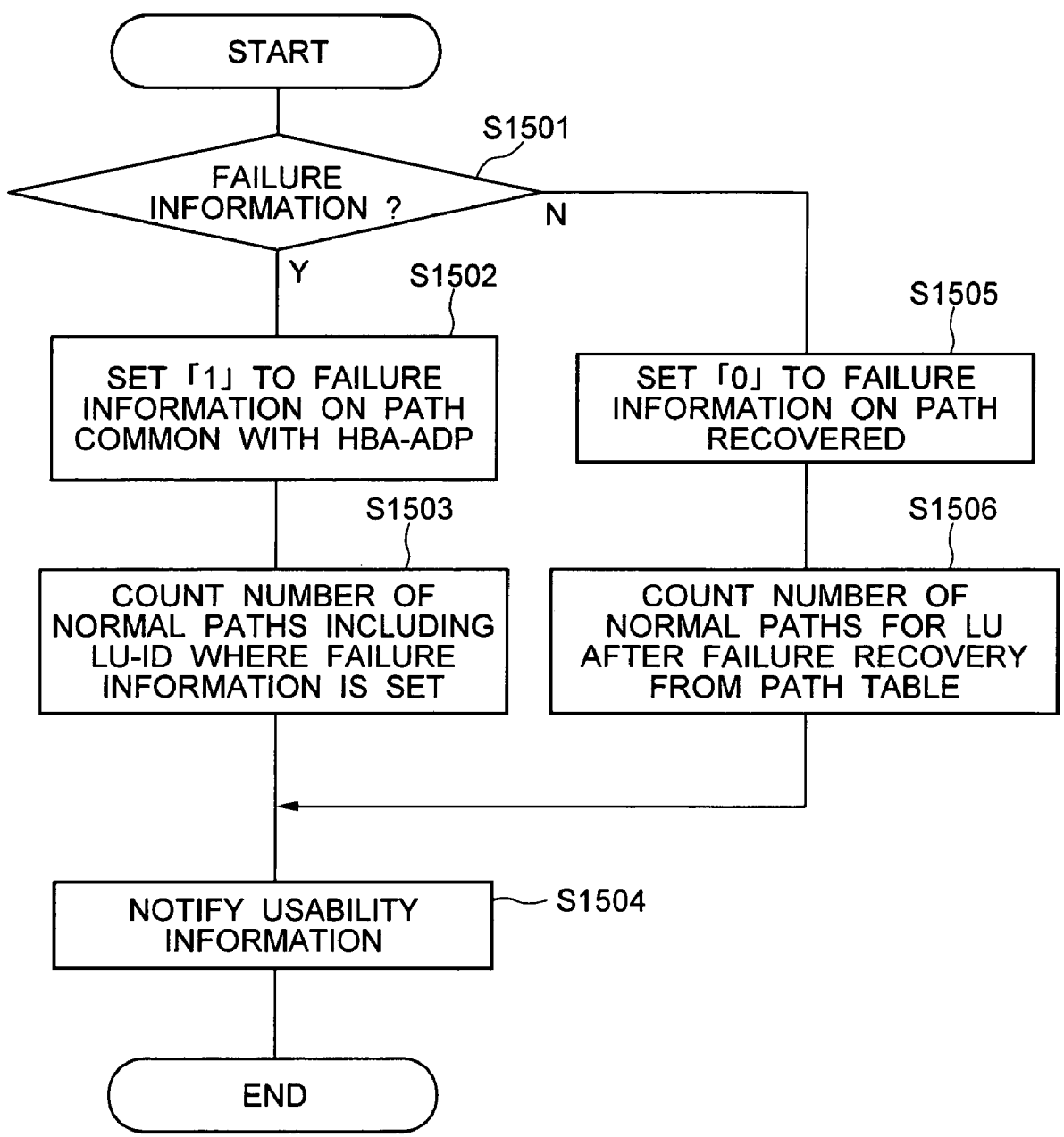
FIG. 15 is flowchart showing an example of processing of the path information management unit.

FIG. 15 shows an example of processing of the path information management unit 226.

The path information management unit 226 starts processing upon reception of the failure information or the failure recovery information. Firstly, the path information management unit 226 judges whether the information is failure information (S1501). If the information is failure information, "1" is set in the path failure information 605 of the path common to the HBA and ADP of the path ID contained in the failure information (S1502). For example, when the path ID of path number "1" is notified as failure information, the path information management unit 226 sets "1" to the path failure information 605 of the path numbers "9" and "17" sharing the HBA1-ADP1 other than the path number "1".

Next, the number of normal paths among the paths containing the LU-ID in which the path failure information 605 is modified to "1" is counted (S1503). The LU-ID and the counted number of normal paths are notified as usability information to the I/O end notification unit 222.

On the other hand, when the information is judged to be other than failure information ("N" in S1501), "0" is set in the path failure information 605 of the path ID contained in the failure recovery information and the number of normal paths contained in the paths including the LU-ID modified to "0" is counted (S1506). The LU-ID and the number of normal paths counted are notified as usability information to the I/O end notification unit 222.

It should be noted that as has been explained with reference to FIG. 5, etc., the logical unit switching unit 211 which has received usability information determines the primary and the secondary logical unit according to the number of normal paths when the logical units specified by the LU-ID contained in the usability information constitute a pair, and updates the LU management table 300.

It should be noted that here explanation has been given on the paths sharing the HBA-ADP. However, by modifying the processing of Step 1502 shown in FIG. 15, the same can be performed for the other common portion. For example, failure can be set for the path sharing the ADP-LU, or HBA, or CHA with the path in which failure has occurred.

Thus, when a failure has occurred in one path (access path), the path (access path) associated with the path (access path) where the failure has occurred is also assumed to be a path containing a failure, so that use of the path (access path) having possibility of failure can be evaded, thereby improving the throughput.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information processing system comprising:
    a storage device having a plurality of storage areas, each of the storage areas storing same data with respect to each other;
    an information processing device coupled to the storage device and issuing an access request; and
    a plurality of access paths for transmitting the access request issued from the information processing device to a storage area,
    wherein the information processing device includes:
    a storage unit for memorizing a path table which stores information for indicating a relation between each of the storage areas and the access paths, path failure information which indicates for each access path whether said access path has failed and path fixed information which indicates for each access path that has failed whether said access path that has failed has been fixed; and
    a processing unit for detecting an access path where a failure has occurred, changing in said path table said path failure information of the access path where the failure has occurred to indicate that a failure has occurred in the access path where the failure has occurred, changing in said path table said path failure information of another access path sharing a part of the access path where the failure has occurred to indicate that a failure has occurred in the another access path, setting the path fixed information of each of the access path where the failure has occurred and the another access path to indicate that the failure has not been fixed and changing the path fixed information to indicate that the failure has been fixed when the failure has been fixed, upon detecting the failure in the access path where the failure has occurred, selecting an access path corresponding to path failure information which does not indicate that a failure has occurred in the selected access path when issuing an access request to the storage area, and issuing the access request to the storage area coupled to the selected access path, wherein the storage unit of the information processing device memorizes storage areas where same data is written in a corresponding manner with each other, and wherein the processing unit makes a storage area having a greater number of allocatable access paths an object of a data read request upon detection of the state change of the access path to the storage device, wherein the allocatable access paths are access paths which allow access to the storage area corresponding to path failure information which does not indicate that a failure has occurred in the allocatable access paths.

2. The information processing system as claimed in claim 1, wherein the information processing device includes a memory unit for storing information for indicating a relation between each of the storage areas and a plurality of logical paths to access the storage areas by using the physical paths, and wherein said processing unit for identifies a physical path where a failure has occurred, allocates an access request to a logical path using a physical path other than the physical path where the failure has occurred, and issues the access request to the storage area coupled to the logical path to which the access request was allocated.

3. The information processing system as claimed in claim 1, wherein the processing unit stores information for indicating a relation between each of the storage areas and the access paths, wherein the processing unit, upon detecting an access path where a failure has occurred, allocates an access request to an access path other than an access path where the failure has occurred and another access path sharing a part of the access path where the failure has occurred, and issues the access request to the storage area coupled to the access path to which the access request was allocated.

4. The information processing system as claimed in claim 1, wherein the other access path sharing a part of the access path where the failure has occurred is an access path sharing an access path between the information processing device and the storage device in the access path where the failure has occurred.

5. The information processing system as claimed in claim 1, wherein the other access path sharing a part of the access path where the failure has occurred is an access path sharing an access path between the terminal of the storage device and the storage area of the storage device in the access path where the failure has occurred.

6. The information processing system as claimed in claim 1, the processing unit transmits a signal for confirming failure recovery to the access path where the failure has occurred and making the access path an access path candidate for allocating an access when the failure recovery is detected.

* * * * *